July 1, 1941.     F. OLSEN     2,248,037
COOKING APPARATUS
Filed July 6, 1938
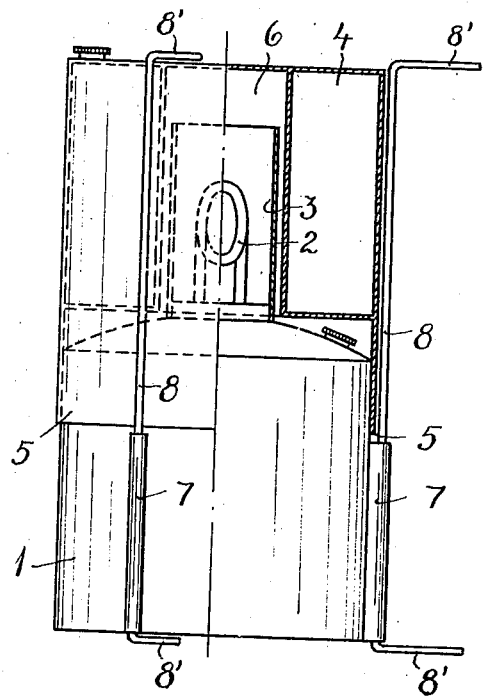
Inventor:
Fredrik Olsen
By: Glascock Downing, & Seebold
Attys.

Patented July 1, 1941

2,248,037

UNITED STATES PATENT OFFICE 2,248,037

COOKING APPARATUS

Fredrik Olsen, Kongsberg, Norway

Application July 6, 1938, Serial No. 217,743
In Norway July 7, 1937

1 Claim. (Cl. 126—38)

The present invention relates to an arrangement in sporting cooking apparatus of the kind which is provided with a spare fuel container, and the invention is mainly characterised thereby that the spare container may be placed on top of the fuel container of the apparatus proper, as the spare container is provided with a cavity for receiving the burner and the blaze casing in such a manner that the assembly obtains the smallest possible extent and is easy to pack and transport.

The invention is illustrated in the accompanying drawing which shows as example a cooking apparatus seen from the side and partly in section.

In the drawing 1 denotes the fuel container of the cooking apparatus proper. The container 1 has preferably a circular cross section and at its upper end is provided with a common burner 2 surrounded by a blaze casing 3.

Above the container 1 is placed a container 4 for spare fuel, the cross section of which preferably corresponds to that of the container 1.

Along its lower circumference the container 4 is provided with a flange 5, which encompasses the upper end of the container 1 and thereby detachably interlocks the containers in the elongation of one another.

At its lower side the container 4 is provided with a central cavity 6 which is so shaped that the burner 2 with the blaze casing 3 may be inserted therein, enabling the container 4 to be carried down practically to rest on the top of container 1. By this arrangement the cooking apparatus with the spare container placed in position thereupon will occupy a minimum of space.

The container 1 is on its circumference provided with a number of bearings 7 for legs 8 which are mounted rotatably in said bearings. Said legs 8 are provided with angle portions 8' at the upper and lower ends, which angle portions, placed in position radially outwards as shown to the right in the drawing and with the container 4 removed, serve as supports for the apparatus proper and a cooking pot respectively.

With the container 4 placed in position as shown, the legs 8 may be turned so that the angle portions thereof extend inwardly above the container 4 and below the container 1 respectively and serve as stops whereby the containers 1 and 4 cannot be separated; at the same time the apparatus has no projecting parts.

As will be understood, the cooking apparatus with the spare container will occupy a minimum of room, and as the spare container is reliably secured to the apparatus, the assembly is especially usable as cooking apparatus for sporting people.

I claim:

Cooking apparatus comprising a main fuel container, a burner at the top of the container, a flame casing surrounding the burner and also carried by the container, a second container for spare fuel having a central cavity in the bottom thereof, means extending from the lower outer edge of the spare container for encompassing the upper part of the main container for detachably connecting the containers together in such manner that the burner and the flame casing are arranged in said cavity, legs vertically disposed and rotatably mounted on the outer surface of the main fuel container and extending upwardly therefrom, and angle portions at the upper and lower ends of the legs serving as stops when turned inwardly to engage the respective containers to detachably hold the containers together and acting as supports when turned and extended outwardly.

FREDRIK OLSEN.